(12) United States Patent
Nakajima et al.

(10) Patent No.: US 6,409,282 B1
(45) Date of Patent: Jun. 25, 2002

(54) BICYCLE HUB

(75) Inventors: Masao Nakajima; Takashi Ohtsuji, both of Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/996,961

(22) Filed: Nov. 30, 2001

Related U.S. Application Data

(62) Division of application No. 09/528,190, filed on Mar. 17, 2000.

(51) Int. Cl.[7] .............................................. B60B 27/00
(52) U.S. Cl. ...................................... 301/110.5; 301/59
(58) Field of Search ............................ 301/55, 58, 59, 301/61, 104, 110.5

(56) References Cited

U.S. PATENT DOCUMENTS

| | | | |
|---|---|---|---|
| 496,844 A | * 5/1893 | Baker | 301/59 |
| 514,965 A | 2/1894 | Rucker et al. | |
| 614,284 A | 11/1898 | Barnett | |
| 1,642,207 A | * 9/1927 | Jones | 301/59 |
| 1,933,178 A | * 10/1933 | Le Juene | 301/110.5 |
| 1,959,007 A | * 5/1934 | Schweitzer | 301/59 |
| 5,487,592 A | 1/1996 | Rasmussen | |
| 5,938,293 A | 8/1999 | Dietrich | |
| 6,010,197 A | 1/2000 | Crosnier et al. | |
| 6,145,938 A | 11/2000 | Dietrich | |

FOREIGN PATENT DOCUMENTS

| | | |
|---|---|---|
| DE | 43 06 592 A1 | 9/1994 |
| DE | 44 15 505 C2 | 2/1997 |
| EP | 0 764 551 A1 | 3/1997 |
| EP | 0 841 549 A1 | 5/1998 |
| FR | 2 387 802 A1 | 11/1978 |
| FR | 2 736 869 B1 | 10/1997 |
| FR | 2 755 399 B1 | 8/1999 |

OTHER PUBLICATIONS

Literature from Campagnolo, S.r.l., Apr. 6, 2000, Three (3) pages, Vincenza, Italy.

* cited by examiner

*Primary Examiner*—Russell D. Stormer
(74) *Attorney, Agent, or Firm*—Shinjyu Global IP Counselors, LLP

(57) ABSTRACT

A bicycle hub is provided for use with bicycle spokes with spoke nipples threadedly coupled to their inner ends. The bicycle hub includes a hub axle and a hub body. The hub axle has a center axis extending between a first end and a second end. The hub body has a tubular center portion defining an interior passageway and a first mounting portion coupled to a first end of the center portion. The center portion defines an interior passageway with the hub axle being rotatably supported in the interior passageway. The first mounting portion has a plurality of first spoke openings extending axially to a first free edge and a plurality of first protrusions extending radially inwardly from the first mounting portion. The plurality of first protrusions are fixedly coupled to the first mounting portion. The bicycle hub also includes a second mounting portion coupled to a second end of the central portion. The second mounting portion has a plurality of second spoke openings. The second mounting portion can be different than the first mounting portion.

21 Claims, 12 Drawing Sheets

BICYCLE HUB

CROSS-REFERENCE TO RELATED APPLICATION

This application is a divisional application of U.S. patent application Ser. No. 09/528,190, filed on Mar. 17, 2000, which is pending. The entire disclosure of U.S. patent application Ser. No. 09/528,190 is hereby incorporated herein by reference.

BACKGROUND OF THE INVENTION

1. Field of the Invention

This invention generally relates to a bicycle hub for use with bicycle spokes. More specifically, the present invention relates to a bicycle hub that maintains spoke nipples in spoke openings of the hub.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles that has been extensively redesigned over the past years is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub is attached to a part of the frame of the bicycle for relative rotation. The spokes extend outwardly from the hub to the annular rim. The annular rim has a recess for supporting a pneumatic tire thereon. Typically, the spokes of the bicycle wheel were thin metal wire spokes. The ends of the hub are provided with a flange that is used to couple the spoke portions thereto. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples that secure the outer ends of the wire spokes to the rim. In particular, the spoke nipples have flanges, which engage the interior surface of the rim.

With a spoke constructed in this manner, the nipple is installed in a nipple hole formed in the rim, the spoke is inserted through the hole of the hub flange with the flange of the inner end of the spoke engaging the hole of the hub flange. The male threads on the outer ends of the spokes are threaded into the female threads of the spoke nipples installed in the openings of the rim. It is desirable in the bicycle industry to have as few spokes as possible. One problem with conventional spokes is the concentrated stress applied to the rim. Moreover, if fewer spokes are used, the stress on the rim becomes increasingly larger.

Recently, some bicycle wheel designs have reversed the spoke arrangement so that each of the spokes has an outer portion secured to the rim and a threaded end secured to the hub. The inner end can be secured to the hub via conventional spoke nipples. The conventional spoke nipples typically include a head portion and an internally threaded shaft portion. However, in these bicycle wheels, it can be difficult to install the spokes in the hub. Moreover, once installed in the hub, it can be difficult to retain the spokes in the hub. Furthermore, such bicycle wheels can be complicated and expensive to assemble and manufacture.

In view of the above, there exists a need for a bicycle hub that maintains spoke nipples in spoke openings in the hub which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub that allows spokes to be easily installed in spoke openings in the hub.

Another object of the present invention is to provide a bicycle hub that uses spoke nipples to mount spokes in the spoke openings of the hub.

Another object of the present invention is to provide a bicycle hub that maintains spokes in the spoke openings of the hub using spoke nipples.

Yet another object of the present invention is to provide a bicycle hub that is relatively simple and inexpensive.

The foregoing objects can be obtained by providing a bicycle hub for use with spoke nipples. The bicycle hub includes a hub axle and a hub body. The hub axle has a center axis extending between a first end and a second end. The hub body has a tubular center portion and a first mounting portion coupled to a first end of the center portion. The center portion defines an interior passageway with the hub axle being rotatably supported in the interior passageway. The first mounting portion has a plurality of first spoke openings extending axially to a first free edge and a plurality of first protrusions extending radially inwardly from the first mounting portion. The plurality of first protrusions are fixedly coupled to the first mounting portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
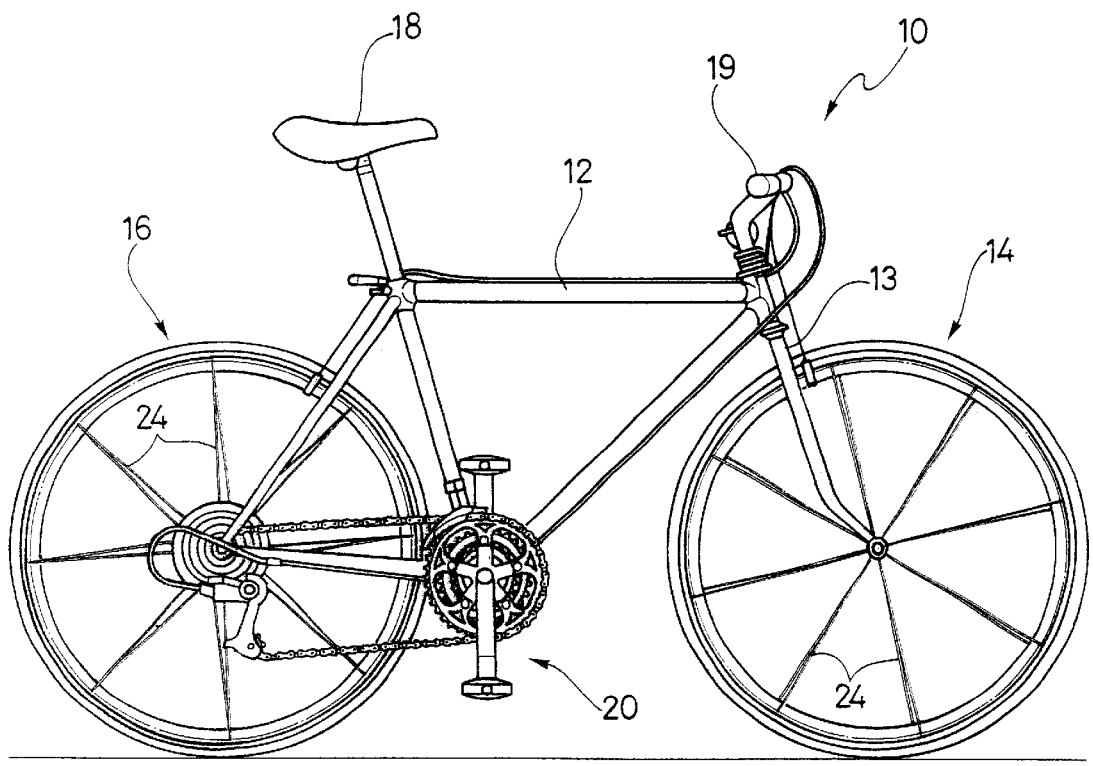
FIG. 1 is a side elevational view of a bicycle with front and rear wheels illustrated in accordance with the present invention.
Figure 2:
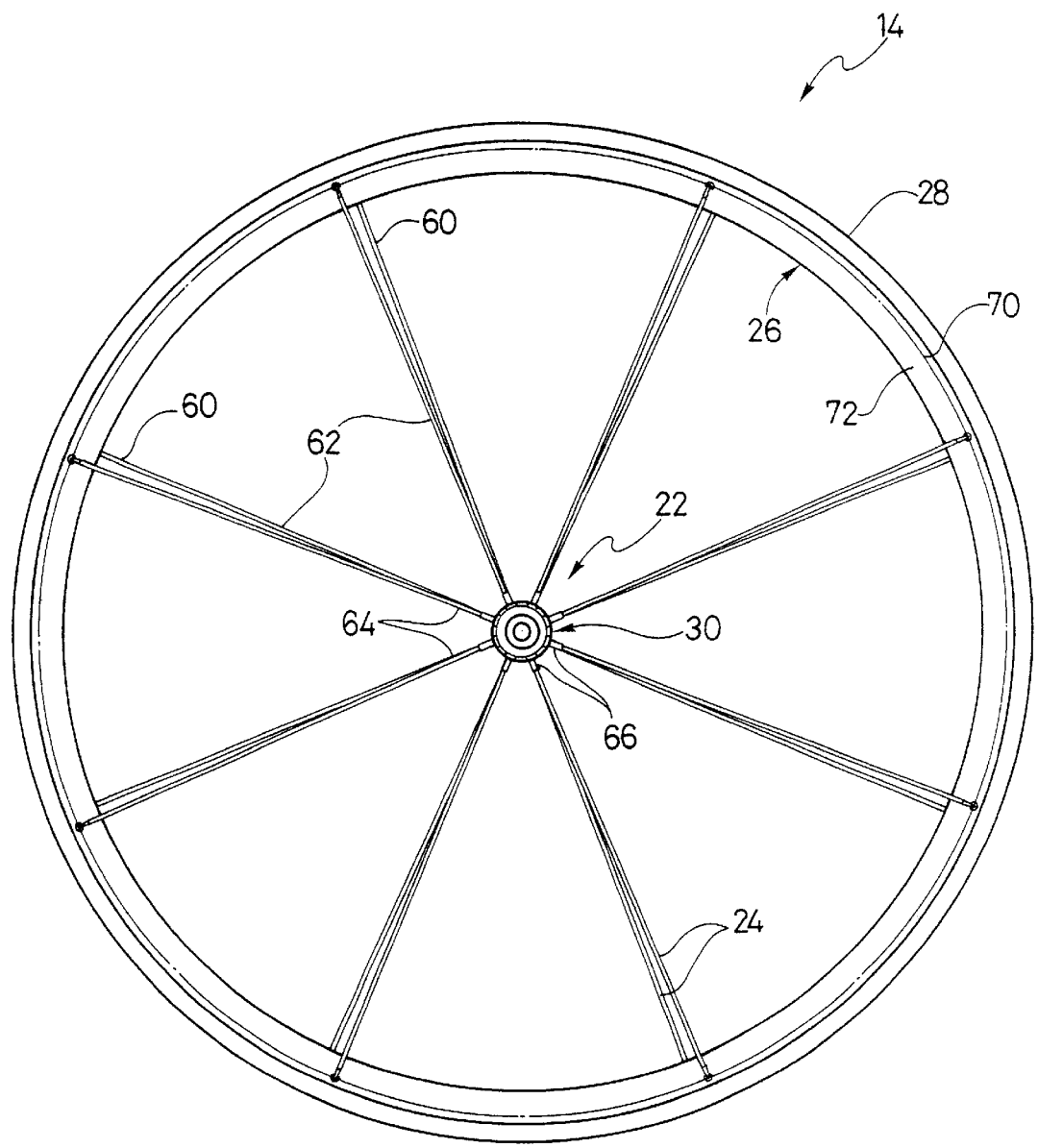
FIG. 2 is an enlarged side elevational view of the front wheel illustrated in FIG. 1.
Figure 3:
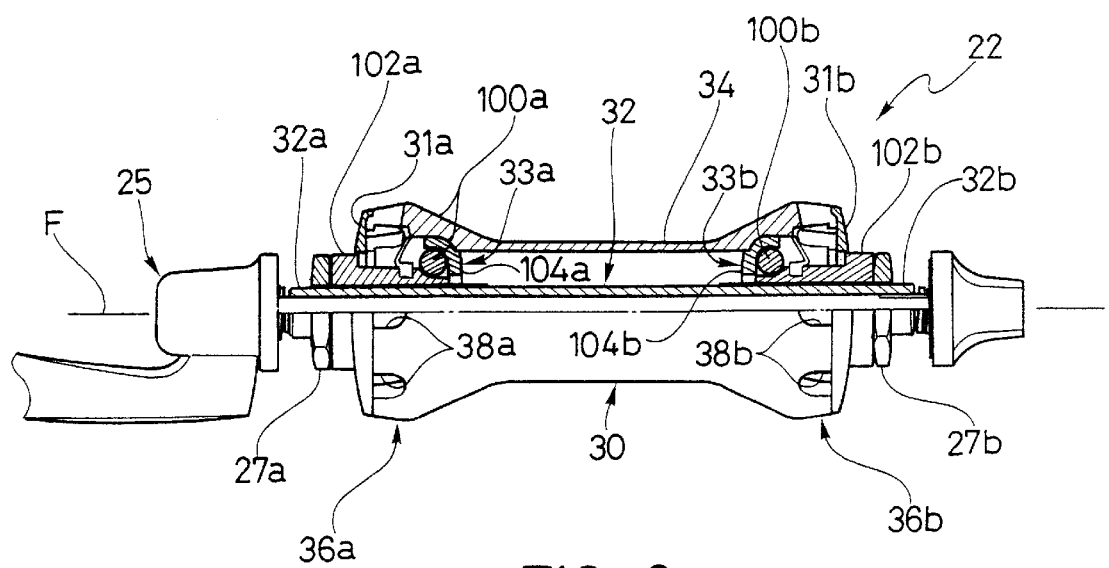
FIG. 3 is an enlarged, top plan view a front hub having a hub body of the bicycle wheel illustrated in FIGS. 1 and 2 with portions shown in cross-section for the purpose of illustration.
Figure 4:
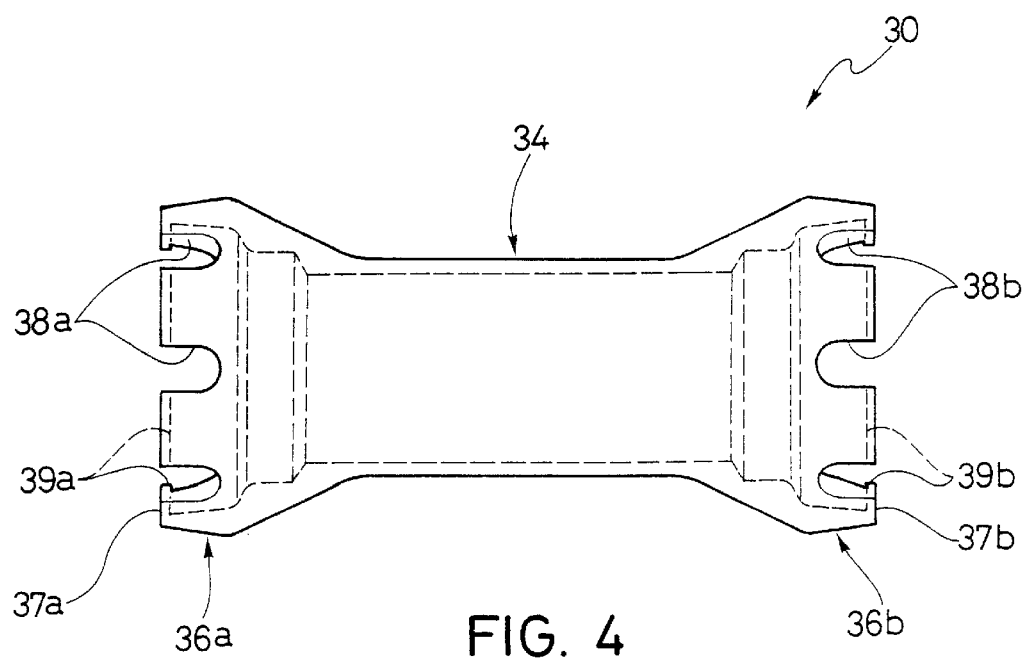
FIG. 4 is an enlarged, top plan view of the hub body of the front hub illustrated in FIG. 3.
Figure 5:
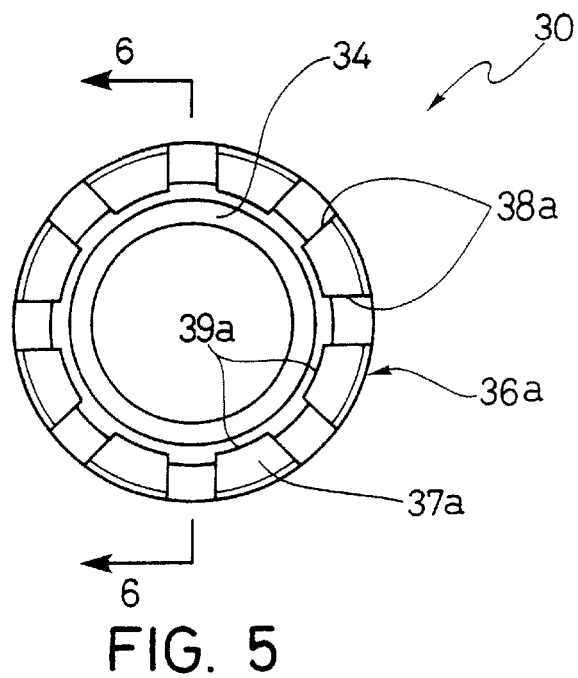
FIG. 5 is a left side elevational view of the hub body illustrated in FIG. 3.
Figure 6:
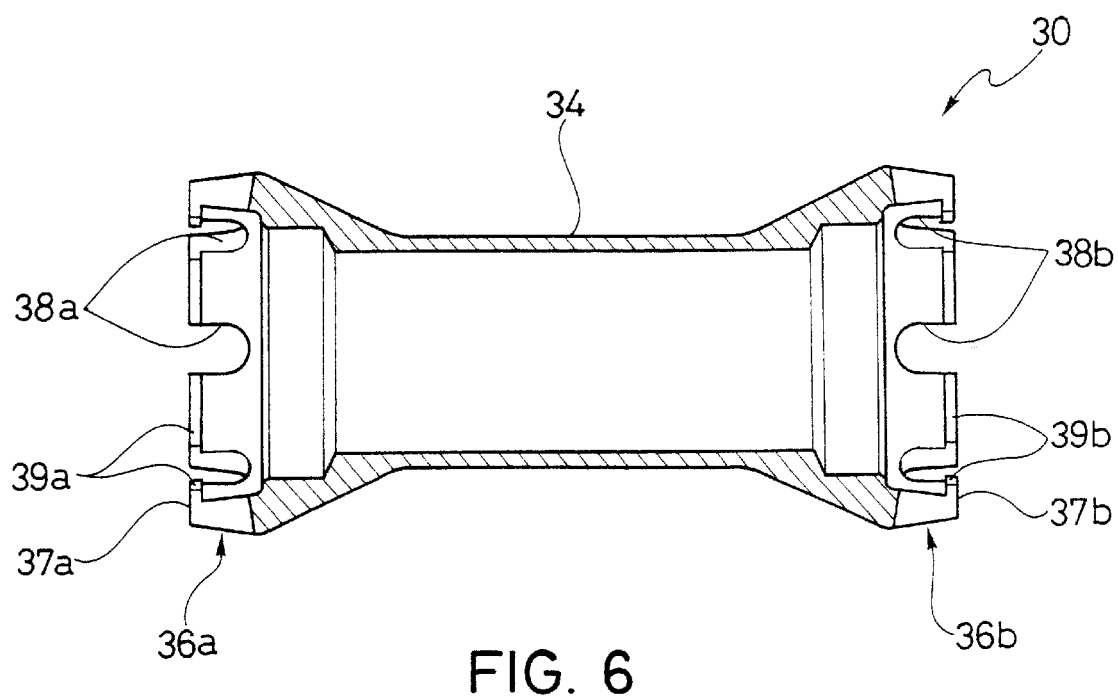
FIG. 6 is a cross-sectional view of the hub body illustrated in FIGS. 4–5, as seen along section line 6—6 of FIG. 5.
Figure 12:
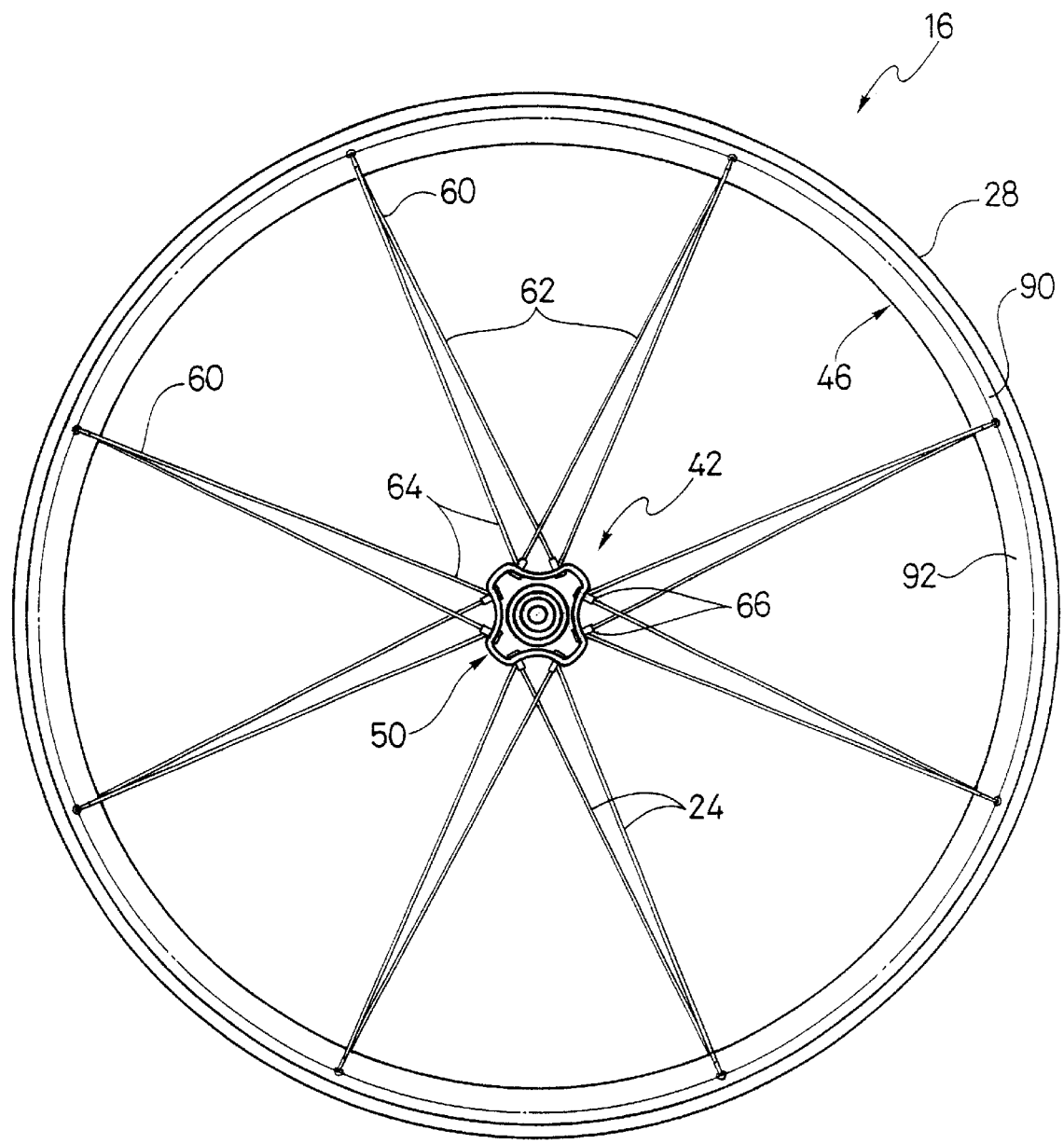
FIG. 12 is an enlarged side elevational view of the rear wheel of the bicycle illustrated in FIG. 1.
Figure 13:
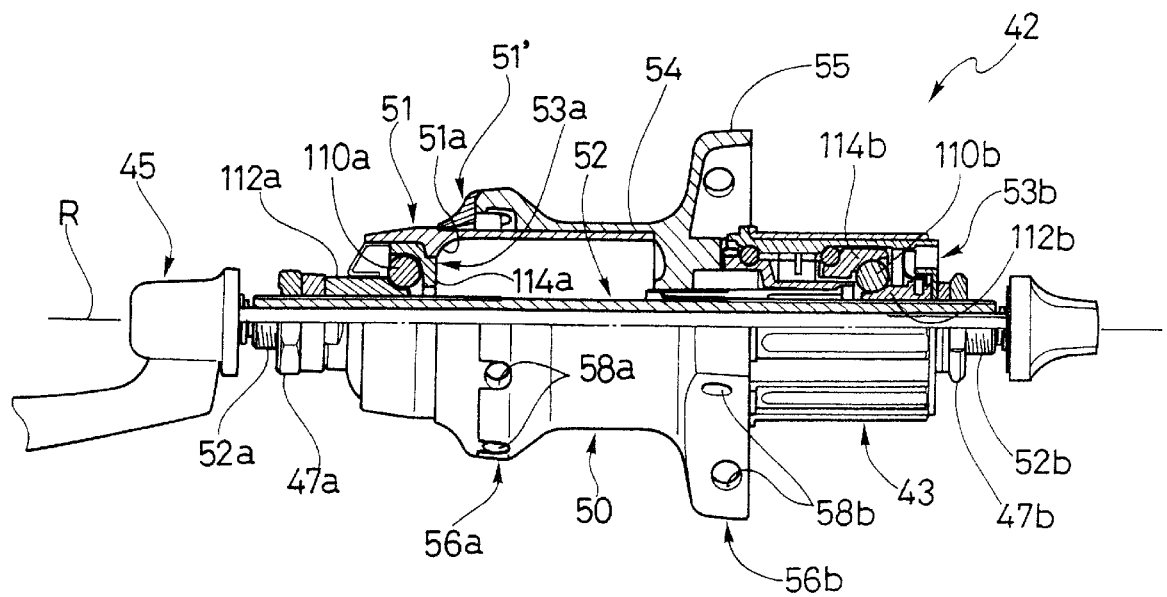
FIG. 13 is an enlarged, top plan view of a rear hub having a hub body of the rear bicycle wheel illustrated in FIGS. 1 and 12 with portions shown in cross-section for the purpose of illustration.
Figure 14:
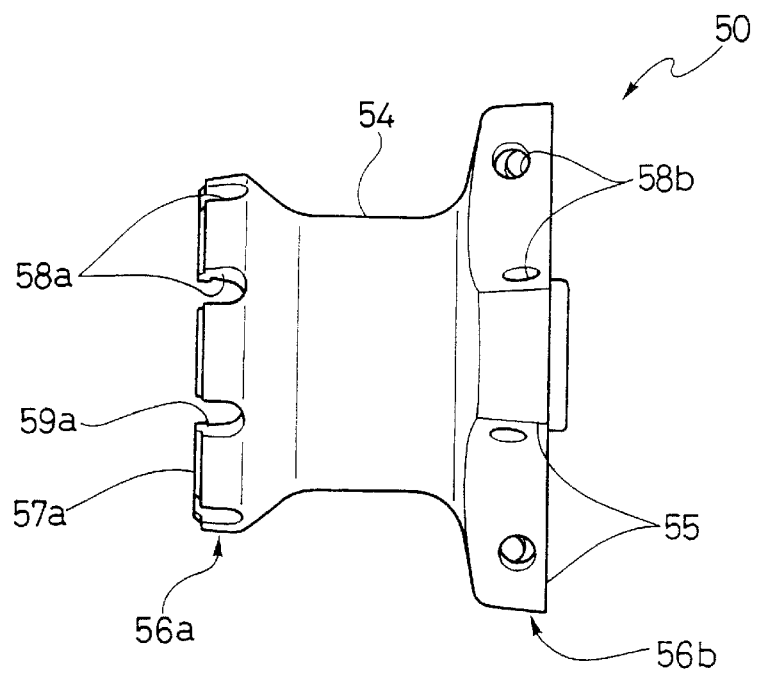
FIG. 14 is an enlarged, top plan view of the hub body of the rear hub illustrated in FIG. 13.
Figure 15:
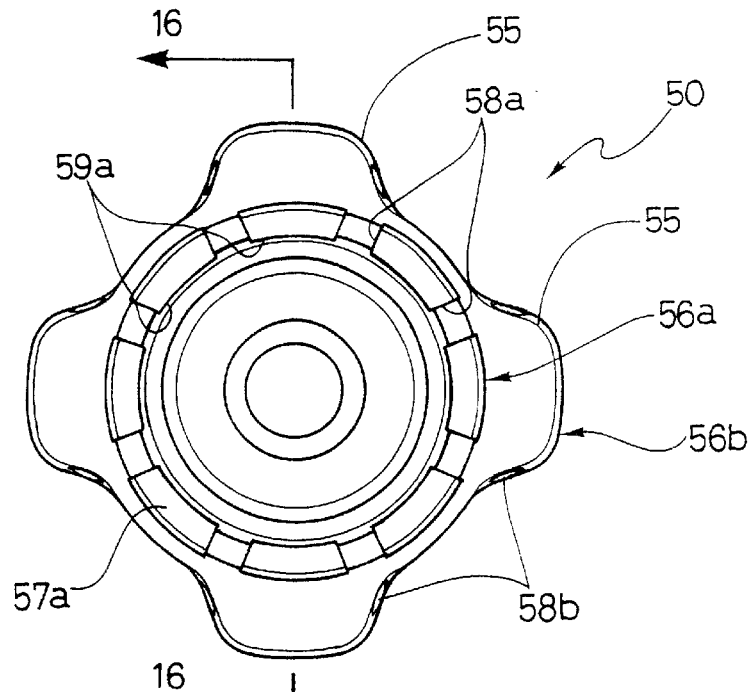
FIG. 15 is a left side elevational view of the hub body illustrated in FIG. 14.
Figure 16:
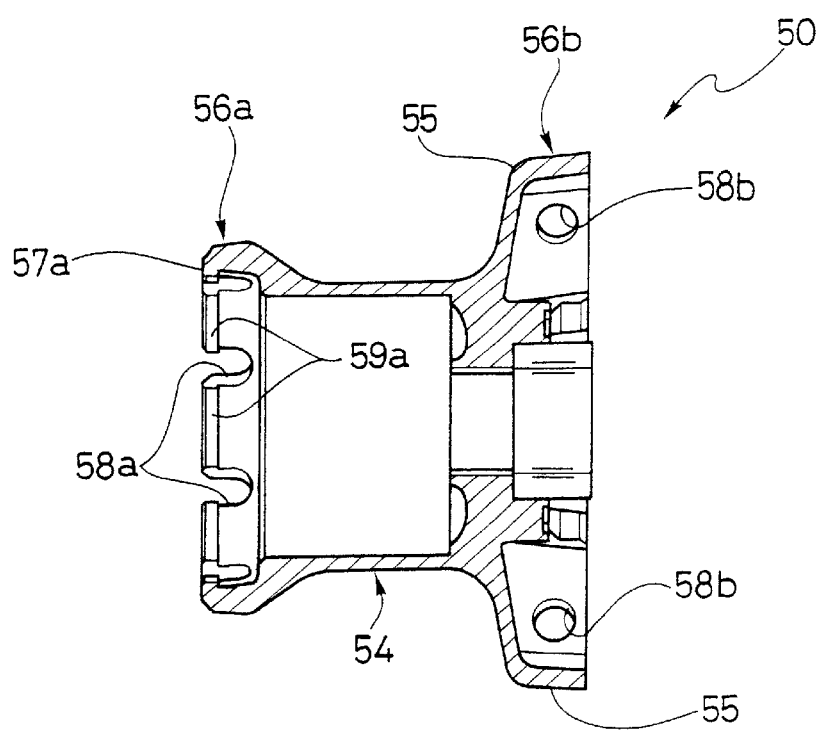
FIG. 16 is a cross-sectional view of the hub body illustrated in FIGS. 14–15, as seen along section line 16—16 of FIG. 15.

Referring initially to FIGS. 1, 2 and 12, a bicycle 10 with a front wheel 14 and a rear wheel 16 illustrated in accordance with the present invention. The bicycle 10 basically has a frame 12 with a front fork 13 movably coupled thereto. Rear wheel 16 is rotatably coupled to a rear portion of the frame 12, while front wheel 14 is rotatably coupled to the front fork 13. The frame 12 also has a seat 18 adjustably coupled to frame 12, a handlebar 19 coupled to front fork 13 for turning front wheel 14 and a drive train 20 for propelling bicycle 10.

Since these parts of bicycle 10 are well known in the art, these parts will not be discussed or illustrated in detail herein, except as they are modified in accordance with the present invention. Moreover, various conventional bicycle parts such as brakes, derailleurs, additional sprockets, etc., which are not illustrated and/or discussed in detail herein, can be used in conjunction with the present invention.

Front wheel 14 basically includes a central hub or central mounting portion 22, a plurality of outwardly extending spokes 24 and an annular rim portion 26 with a pneumatic tire 28 coupled thereto in a conventional manner as best seen in FIG. 2. In the illustrated embodiment shown herein, front wheel 14 has sixteen spokes 24 extending radially between central hub 22 and annular rim portion 26. Of course, it will be apparent to those skilled in the art from this disclosure that front wheel 14 can have fewer or more spokes 24 than illustrated if needed and/or desired.

Rear wheel 16 basically includes a central hub or central mounting portion 42, a plurality of outwardly extending spokes 24 and an annular rim portion 46 with a pneumatic tire 28 coupled thereto in a conventional manner as best seen in FIG. 12. In the illustrated embodiment shown herein, rear wheel 16 has sixteen spokes 24 extending radially between central hub 42 and annular rim portion 46. Of course, it will be apparent to those skilled in the art from this disclosure that rear wheel 16 can have fewer or more spokes 24 than illustrated if needed and/or desired.

Front Hub

Referring to FIGS. 3–6, front hub 22 has a tubular hub body portion 30 a first bearing assembly 33a, a second bearing assembly 33b, a quick release mechanism 25 and a hub axle 32 rotatably supported in tubular body portion 30. Quick release mechanism 25 is coupled to hub axle 32 in a conventional manner. Of the parts of front hub 22, only the hub body portion 30 is a non-conventional part. The remaining parts of rear hub 42 are relatively conventional, and thus, the remaining parts of front hub 22 will not be discussed or illustrated in detail herein.

Tubular body portion 30 has tubular center portion 34 and a pair of tubular mounting portions 36a and 36b fixedly coupled to opposite ends of center portion 34 for mounting spokes 24 thereto. First and second bearing assemblies 33a and 33b rotatably support body portion 30 on hub axle 32. Mounting portions 36a and 36b will be referred to as first mounting portion 36a and second mounting portion 36b, respectively. Preferably, second mounting portion 36b is a mirror image of first mounting portion 36a. Each tubular mounting portion 36a and 36b has a plurality of spoke openings 38a and 38b for coupling spokes 24 thereto, respectively. Preferably, each mounting portion 36a and 36b has eight spoke openings 38a and 38b formed therein, respectively. Spoke openings 38a and 38b will be referred to as first spoke openings 38a and second spoke openings 38b, respectively.

Preferably, body portion 30 is formed as a one-piece, unitary member. It will be apparent to those skilled in the art that body portion 30 can be constructed of any substantially rigid material, such as those materials, which are known in the art. For example, body portion 30 can be constructed of any suitable metallic material, such as plated steel, stainless steel, aluminum, magnesium or titanium, as well as other non-metallic materials, such as carbon fiber composite, ceramic or plastic. Moreover, center portion 34, mounting portion 36a and mounting portion 36b could be constructed of different materials as need and/or desired.

Tubular center portion 34 defines an interior passageway and hub axle 32 is rotatably supported therein. Hub axle 32 has a center axis F extending from a first end 32a to a second end 32b. First and second ends 32a and 32b of hub axle 32 are threaded to receive a pair of nuts 27a and 27b. Nuts 27a and 27b hold bearing assemblies 33a and 33b, body portion 30 and hub axle 32 together when hub 22 is assembled. First mounting portion 36a is arranged adjacent first end 32a of hub axle 32 and second mounting portion 36b is arranged adjacent second end 32b of hub axle 32. The pair of tubular mounting portions 36a and 36b support a plurality of spokes 24 in spoke openings 38a and 38b with spoke nipples 66. More specifically, spokes 24 have spoke nipples 66 threaded to their inner ends, and spoke nipples 66 are arranged in spoke openings 38a and 38b to couple front hub 22 to annular rim portion 26.

Each tubular mounting portion 36a and 36b has a free edge 37a and 37b, respectively located at opposite ends of body portion 30. Free edges 37a and 37b will be referred to as first free edge 37a and second free edge 37b, respectively. Each mounting portion 36a and 36b preferably has larger inner and outer diameters than center portion 30 and hub axle 32. Spoke openings 38a and 38b are formed as elongated slots extending axially from free edges 37a and 37b, respectively. Moreover, spoke openings 38a and 38b are sized to allow spoke nipples 66 to be sidably received therein. Therefore, spokes 24 with spoke nipples 66 threadedly coupled thereto can be axially inserted in spoke openings 38a and 38b from opposite ends of front hub 22.

Mounting portions 36a and 36b have a plurality of protrusions 39a and 39b fixedly coupled thereto and extending radially inwardly from mounting portions 36a and 36b, respectively. Protrusions 39a and 39b will be referred to as first protrusions 39a and second protrusions 39b, respectively. Protrusions 39a and 39b are adjacent spoke openings 38a and 38b to maintain the spoke nipples 66 therein. Specifically, protrusions 39a and 39b are formed as circumferential internal flanges extending radially inwardly from free edges 37a and 37b toward center axis F of hub axle 32. With this arrangement, protrusions 39a and 39b can engage heads of spoke nipples 66 to prevent spokes 24 from moving axially out of spoke openings 38a and 38b when front wheel 14 is assembled. More specifically, each of the protrusions 39a and 39b extends between a pair of adjacent spoke openings 38a and 38b, respectively.

Figure 7:
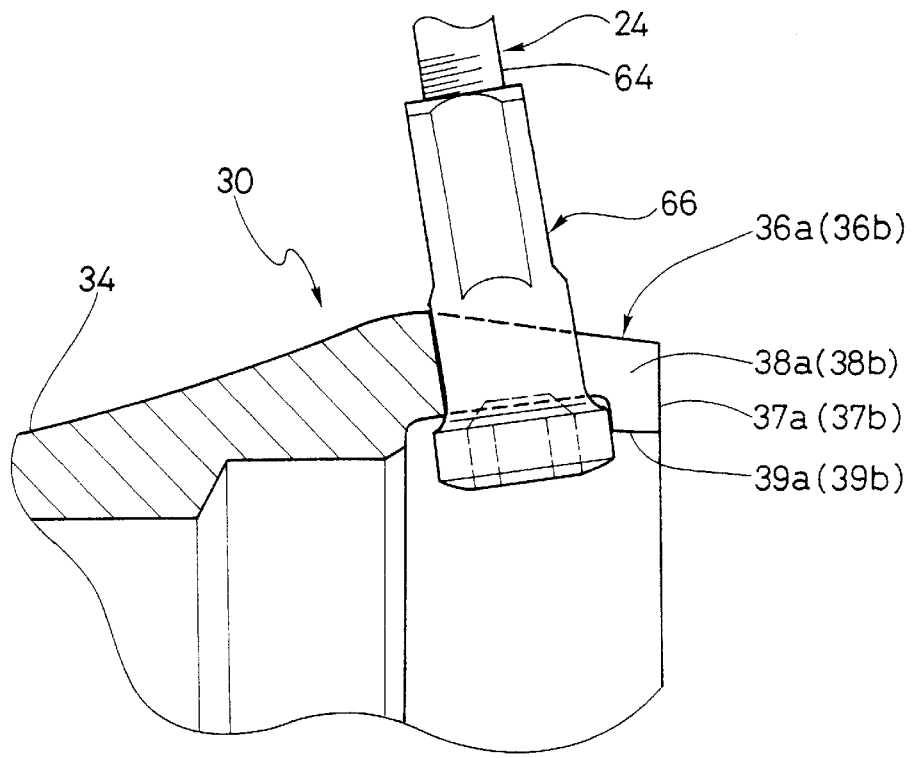
FIG. 7 is a partial, enlarged cross-sectional view of a portion of the hub body illustrated in FIGS. 4–6 with a spoke nipple arranged in a spoke hole.
Figure 8:
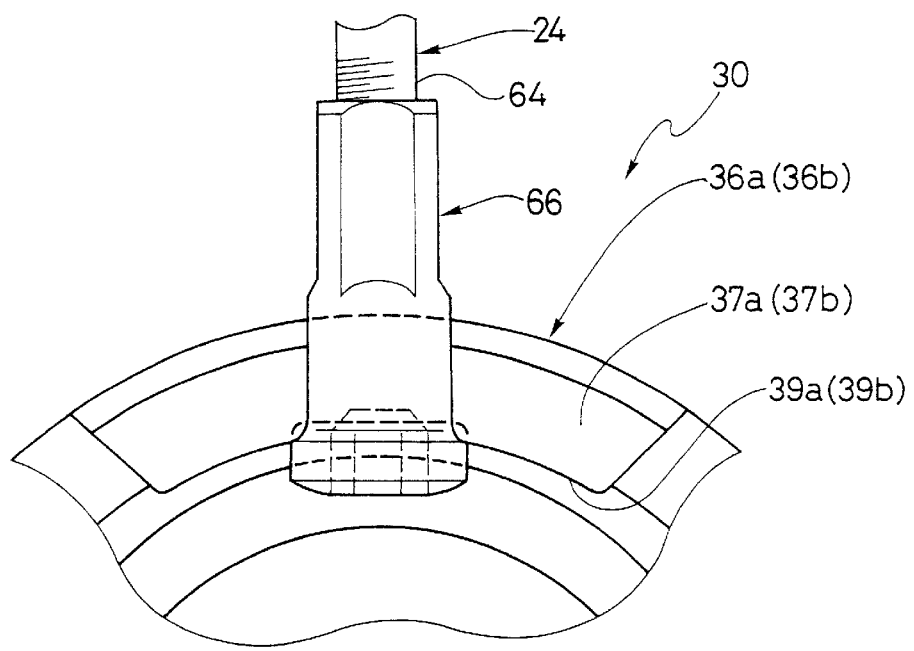
FIG. 8 is a right side elevational view of the portion of the hub body and spoke nipple illustrated in FIG. 7.

Referring to FIGS. 7 and 8, the retention of spoke nipples 66 in spoke openings 38a and 38b will be discussed in more detail. Specifically, in assembling front wheel 14, spokes 24 with spoke nipples 66 coupled thereto are axially moved into spoke openings 38a and 38b prior to tightening spokes 24 between front hub 22 and annular rim portion 26. Accordingly, each spoke 24 and spoke nipple 66 can be easily inserted in spoke openings 38a and 38b. However, when spoke nipples 66 are rotated relative to spokes 24, a tensional force is applied to spokes 24 and spoke nipples 66 move radially outward toward rim 26.

More specifically, the heads of spoke nipples 66 are tightened against the inner surfaces of tubular mounting portions 36a and 36b as best seen in FIG. 7. In this tightened position, heads of spoke nipples 66 engage protrusions 39a and 39b to prevent axial movement of spoke nipples 66 and spokes 24 relative to body portion 30 of front hub 22. Accordingly, spokes 24 and spoke nipples 66 cannot be accidentally displaced from spoke openings 38a and 38b, and a reliable wheel construction is attained. Preferably, a pair of covers 31a and 31b are arranged at first and second free edges 37a and 37b, respectively when hub 22 of front wheel 14 is assembled.

As mentioned above, first and second bearing assemblies 33a and 33b rotatably support hub body portion 30 on hub axle 32. The bearing assembly 33a basically includes a plurality of balls 100a located between an inner race member 102a and an outer race member 104a. Similarly, the bearing assembly 33b basically includes a plurality of balls 100b located between an inner race member 102b and an outer race member 104b. Since bearing assemblies 33a and 33b and are well know in the bicycle art, they will not be discussed or illustrated in detail herein.

Rear Hub

Referring to FIGS. 13–16, rear hub 42 has a tubular hub body portion 50, a bearing support sleeve 51, a first bearing assembly 53a, a second bearing assembly 53b, a freewheel mounting portion 43, a quick release mechanism 45 and a hub axle 52. Hub axle 52 is rotatably supported in tubular body portion 50 by bearing assemblies 53a and 53b. Quick release mechanism 43 is coupled to hub axle 52 in a conventional manner. Freewheel mounting portion 43 is coupled to body portion 50 in a conventional manner and has a plurality of splines for receiving a freewheel (not shown).

Of the parts of rear hub 42, only the hub body portion 50 and the bearing support sleeve 51 are non-conventional parts. The remaining parts of rear hub 42 are relatively conventional, and thus, the remaining parts of rear hub 42 will not be discussed or illustrated in detail herein.

Tubular body portion 50 has tubular center portion 54 and a pair of tubular mounting portions 56a and 56b fixedly coupled to opposite ends of center portion 54 for mounting spokes 24 thereto. First and second bearing assemblies 53a and 53b rotatably support body portion 50 on hub axle 52. Mounting portions 56a and 56b will be referred to as first mounting portion 56a and second mounting portion 56b. Second mounting portion 56b is different from first mounting portion 56a so that a free wheel (not shown) can be coupled to rear hub 42. Each tubular mounting portion 56a and 56b has a plurality of spoke openings 58a and 58b for coupling spokes 24 thereto. Preferably, each mounting portion 56a and 56b has eight spoke openings 58a and 58b formed therein, respectively. Spoke openings 58a and 58b will be referred to as first spoke openings 58a and second spoke openings 58b, respectively.

Preferably, body portion 50 is formed as a one-piece, unitary member. It will be apparent to those skilled in the art that body portion 50 can be constructed of any substantially rigid material, such as those materials, which are known in the art. For example, body portion 50 can be constructed of any suitable metallic material, such as plated steel, stainless steel, aluminum, magnesium or titanium, as well as other non-metallic materials, such as carbon fiber composite, ceramic or plastic. Moreover, center portion 54, first mounting portion 56a and second mounting portion 56b could be constructed of different materials as need and/or desired.

Tubular center portion 54 defines an interior passageway and hub axle 52 is rotatably supported therein. Hub axle 52 has a center axis R extending from a first end 52a to a second end 52b. First and second ends 52a and 52b of hub axle 52 are threaded to receive a pair of nuts 47a and 47b. Nuts 47a and 47b hold bearing assemblies 53a and 53b, body portion 50 and hub axle 52 together when hub 42 is assembled. First mounting portion 56a is arranged adjacent first end 52a of hub axle 52 and second mounting portion 56b is arranged adjacent second end 52b of hub axle 52. The pair of tubular mounting portions 56a and 56b support a plurality of spokes 24 in spoke openings 58a and 58b with spoke nipples 66. More specifically, spokes 24 have spoke nipples 66 threaded to their inner ends, and spoke nipples 66 are arranged in spoke openings 58a and 58b to couple front hub 22 to annular rim portion 26.

First mounting portion 56a is substantially similar to first mounting portion 36a of front hub 22 except that first mounting portion 56a has larger inner and outer diameters than first mounting portion 36a. First mounting portion 56a has a first free edge 57a and has larger inner and outer diameters than center portion 54 and hub axle 52. Spoke openings 58a are formed as elongated slots extending axially from free edge 57a. Moreover, spoke openings 58a are sized to allow spoke nipples 66 to be slidably received therein. Therefore, spokes 24 with spoke nipples 66 threadedly coupled thereto can be axially inserted in spoke openings 58a from a first end of rear hub 42.

Mounting portion 56a has a plurality of first protrusions 59a fixedly coupled thereto and extending radially inwardly from first mounting portion 56a. Protrusions 59a are adjacent spoke openings 58a to maintain the spoke nipples 66 therein. Specifically, protrusions 59a are formed as circumferential internal flanges extending radially inwardly from first free edge 57a toward center axis R of hub axle 52. With this arrangement, protrusions 59a can engage heads of spoke nipples 66 to prevent spokes 24 from moving axially out of spoke openings 58a when rear wheel 16 is assembled. More specifically, each of the protrusions 59a extends between a pair of adjacent spoke openings 58a. Preferably, a cover 51' is arranged at first free edge 57a when hub 42 of rear wheel 16 is assembled.

Basically, second mounting portion 56b is formed of a plurality of spoke attachment projections 55 and a tapered portion. Second mounting portion 56b is arranged on an opposite side of center portion 54 from first mounting portion 56a. The tapered portion is an annular plate member that extends outwardly from center portion 54. Preferably, second mounting portion 56b has four spoke attachment projections 55 with a pair of opposing spoke openings 58b formed in each spoke attachment projection 55 for attaching eight spokes 24 thereto. Accordingly, spoke nipples 66 and spokes 24 are maintained in second spoke openings 58b.

Spoke openings 58b are preferably closed openings with circular cross-sections to retain spoke nipples 66 therein. Of course, second tubular mounting portion 56b can have more or fewer than four spoke attachment projections 55 as needed and/or desired. The number and shape of the spoke attachment projections 55 will depend upon the number of spokes, the type of spokes and the type of wheel. Moreover, each spoke attachment projection 55 can have more or fewer spoke openings 58b and spoke openings can have different configurations as needed and/or desired.

In attaching spokes 24 to second mounting portion 56b, inner end portions of spokes 24 are inserted through one (external) end of second spoke openings 58b of body portion 50, and then spoke nipples 66 are inserted through the other (internal) end of second spoke openings 58b. Spoke nipples 66 are threadedly coupled to inner end portions of spokes 24 and engage an internal abutment surface of second mounting portion 56b to fixedly secure spokes 24 to hub 42.

Center portion 54 of body portion 50 has a larger outer diameter than center portion 34 of front hub 22. Center portion 54 has a first maximum internal diameter and a second minimum internal diameter. A bearing support sleeve 51 is non-rotatably coupled within center portion 54 (maximum inner diameter section) and forms a part of hub body 50 when hub 42 is assembled. Bearing support sleeve 51 is a tubular member with an internal flange 51a for supporting bearing assembly 53a.

As mentioned above, first and second bearing assemblies 53a and 53b rotatably support hub body portion 50 on hub axle 52. The bearing assembly 53a basically includes a plurality of balls 110a located between an inner race member 112a and an outer race member 114a. Similarly, the bearing assembly 53b basically includes a plurality of balls 110b located between an inner race member 112b and an outer race member 114b. Since bearing assemblies 53a and 53b and are well know in the bicycle art, they will not be discussed or illustrated in detail herein.

Referring to FIGS. 1, 2 and 12, each of the spokes 24 has an outer end portion 60, a center or middle portion 62 and a threaded inner end portion 64. Straight center portion 62 of a spoke 24 is located radially inwardly of outer end portion 60, and inner end portion 64 located radially inwardly of the center portion 62. Spokes 24 are coupled to hubs 22 and 42 at inner ends 64 of spokes 24 as discussed above. Preferably, outer end portion 60, center portion 62 and inner end portion 64 are constructed as a unitary, one-piece member with spoke nipples 66 theadedly coupled to the inner end portion 64 of each of the spokes 24 for connection to hubs 22 and 42.

As best seen in FIGS. 9, 10, 17 and 18, outer end portions 60 of spokes 24 have a bent section 60a with an enlarged head 60b at the free end of bent section 60a. Heads 60b are offset from bent sections 60a. The head 60b has a larger width or diameter than bent section 60a to secure spoke 24 to rims 26 and 46 via reinforcement member or washer 68. Center portions 62 and inner end portions 64 each have a circular or elliptical cross section. Of course, it will be apparent to those skilled in the art that constant cross section spokes can be utilized or spokes with a varying cross section can be utilized as needed and/or desired. Moreover, spokes with other cross-sections could be utilized without departing from the scope of the present invention.

Of course, it will also be apparent to those skilled in the art from this disclosure that outer end portions 60 can be bent or formed to have a different shape and/or cross section than the illustrated shapes and cross sections. Moreover, outer end portions 60 of spokes 24 could be designed to be directly coupled to a different bicycle rim without the use of reinforcement members or washers 68 as needed and/or desired. In any event, the shapes and cross sections of outer end portions 60 of each spoke 24 should be configured to prevent axial movement of the spokes 24 relative to rims 26 and 46 when the spoke 24 is in the installed position.

Figure 9:
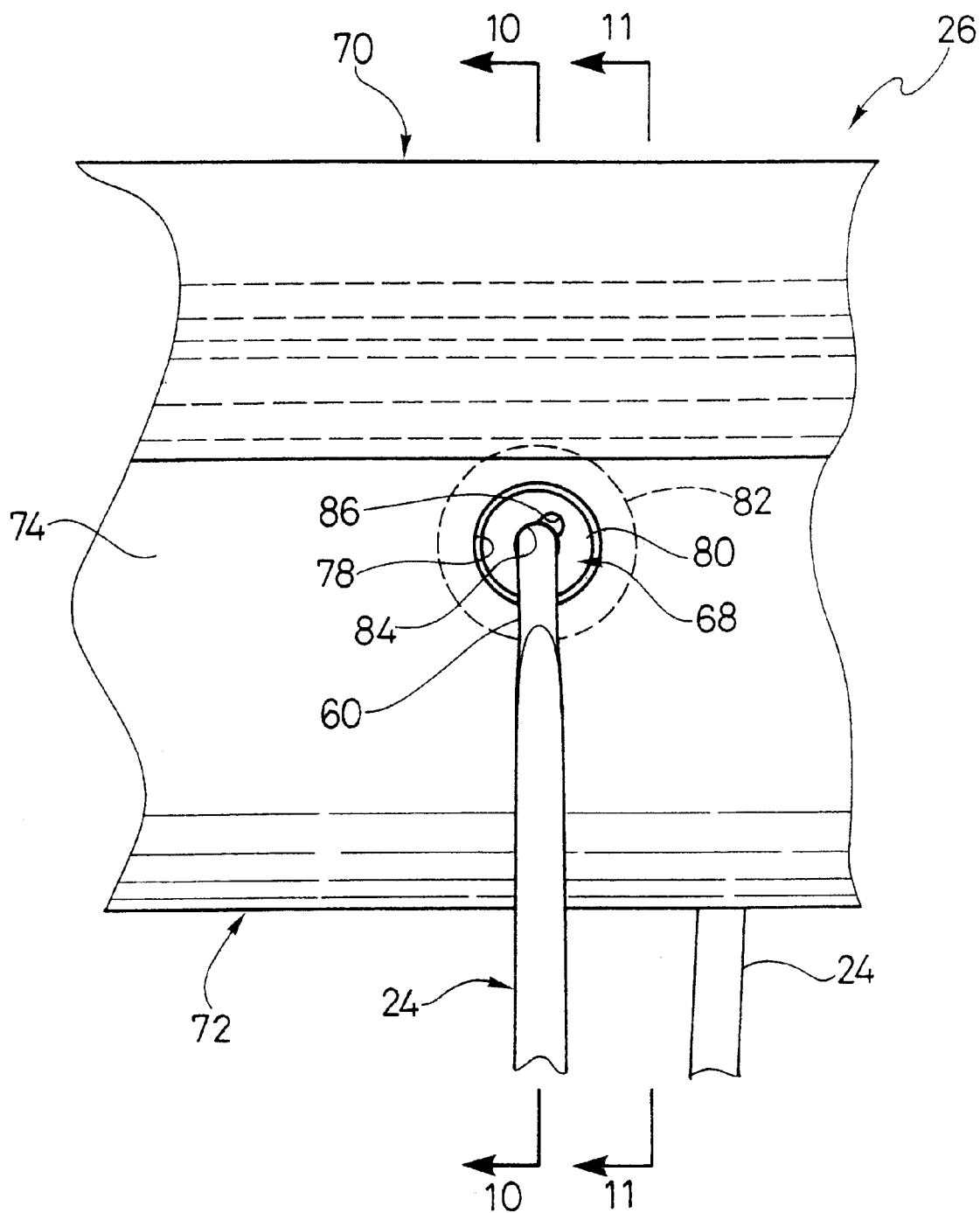
FIG. 9 is an enlarged, partial side elevational view of the rim of the front wheel illustrated in FIGS. 1 and 2 with a pair of spokes coupled thereto.
Figure 10:
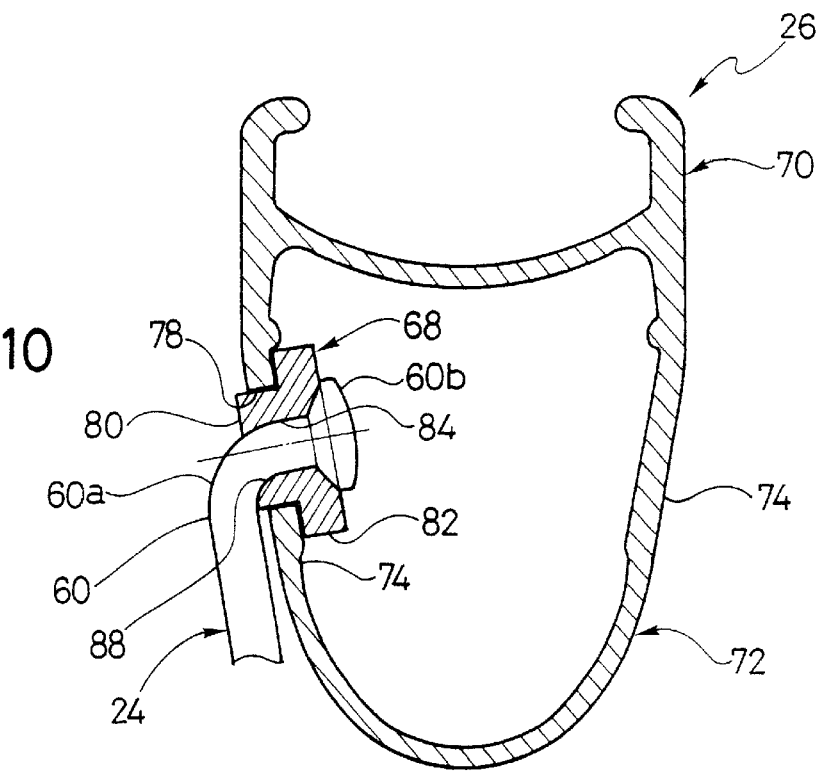
FIG. 10 is a partial, cross-sectional view of the portion of the rim and pair of spokes illustrated in FIG. 9, as seen along section line 10—10 of FIG. 9.
Figure 11:
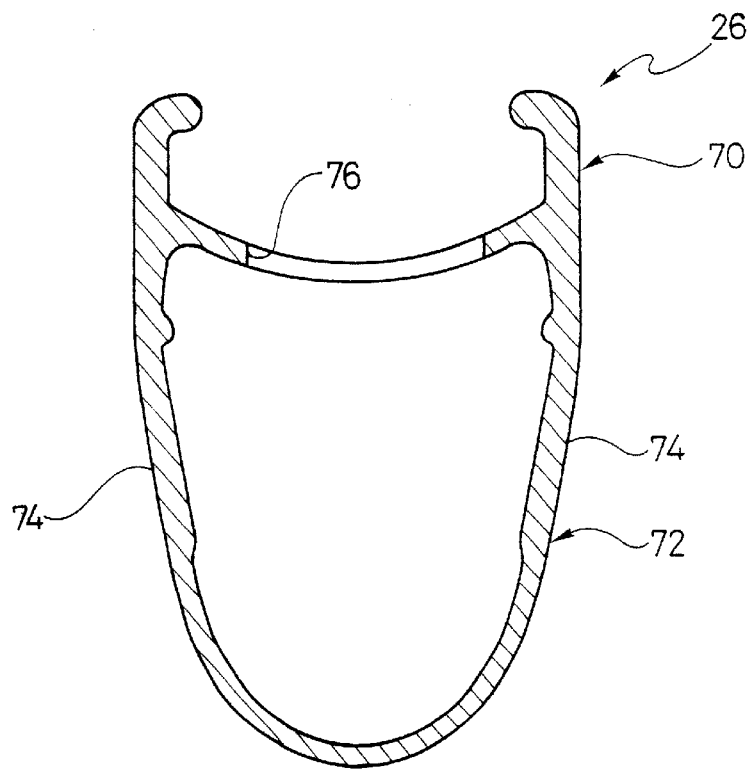
FIG. 11 is a partial, cross-sectional view of the portion of the rim illustrated in FIG. 9, as seen along section line 11—11 of FIG. 9 with a spoke shown in elevation.

Referring to FIGS. 9–11, rim 26 includes an outer annular portion 70 adapted to receive tire 28 and an annular spoke attachment portion 72. The rim 26 is a so-called deep rim in which the rim's radial height is greater than the rim's axial width. Rim 26 is designed to have a "clincher" type pneumatic tire 28 fastened thereto in a conventional manner. It will be apparent to those skilled in the art that the shape of rim 26 could be modified to accommodate different types of tires as needed and/or desired without departing from the scope of the present invention. For example, rim 26 could be modified to accommodate "tubular" or "sew-up" type tires which are adapted to be cemented to an outer surface of a rim. In such a rim, outer annular portion 70 is formed of a curved tubular member and a tire is cemented to the outer surface of the tubular member.

Preferably, outer annular portion 70 of rim 26 has a substantially "U-shaped" cross-section adapted to receive a "clincher" type pneumatic tire 28. Outer annular portion 70 of rim 26 has a plurality of access apertures 76 for inserting spokes 24 therethrough and into a plurality of spoke openings 78 of annular spoke attachment portion 72. Annular spoke attachment portion 72 also has a substantially "U-shaped" cross-section and is fixedly coupled to outer annular portion 70.

Rim 26 is constructed of a substantially rigid material, such as those materials, which are well known in the art. For example, rims 26 can be constructed of any suitable metallic material, such as plated steel, stainless steel, aluminum, magnesium or titanium, as well as other non-metallic materials, such as a carbon fiber composite, which can be utilized for a bicycle wheel. Rim 26 is relatively conventional. Therefore, rim 26 will not be discussed or illustrated in detail herein.

Annular spoke attachment portion 72 is located radially inward of outer annular portion 70. Rim 26 is a tubular member with a hollow, annular inner area. Spoke openings 78 are circumferentially spaced and formed in a pair of opposing side sections 74 of spoke attachment portion 72. Spoke openings 78 are sized for receiving spokes 24 with reinforcement members or washers 68 therein. Reinforcement members or washers 68 are designed to disperse the stresses applied to rim 26 by spokes 24. Each spoke opening 78 is located adjacent one of the access apertures 76 so that a spoke 24 with a reinforcement member 68 can be inserted through access aperture 76 and into spoke opening 78. Moreover, spoke openings 78 formed in one opposing side section 74 are circumferentially staggered from spoke openings 78 formed in the opposite opposing side section 74.

Figure 17:
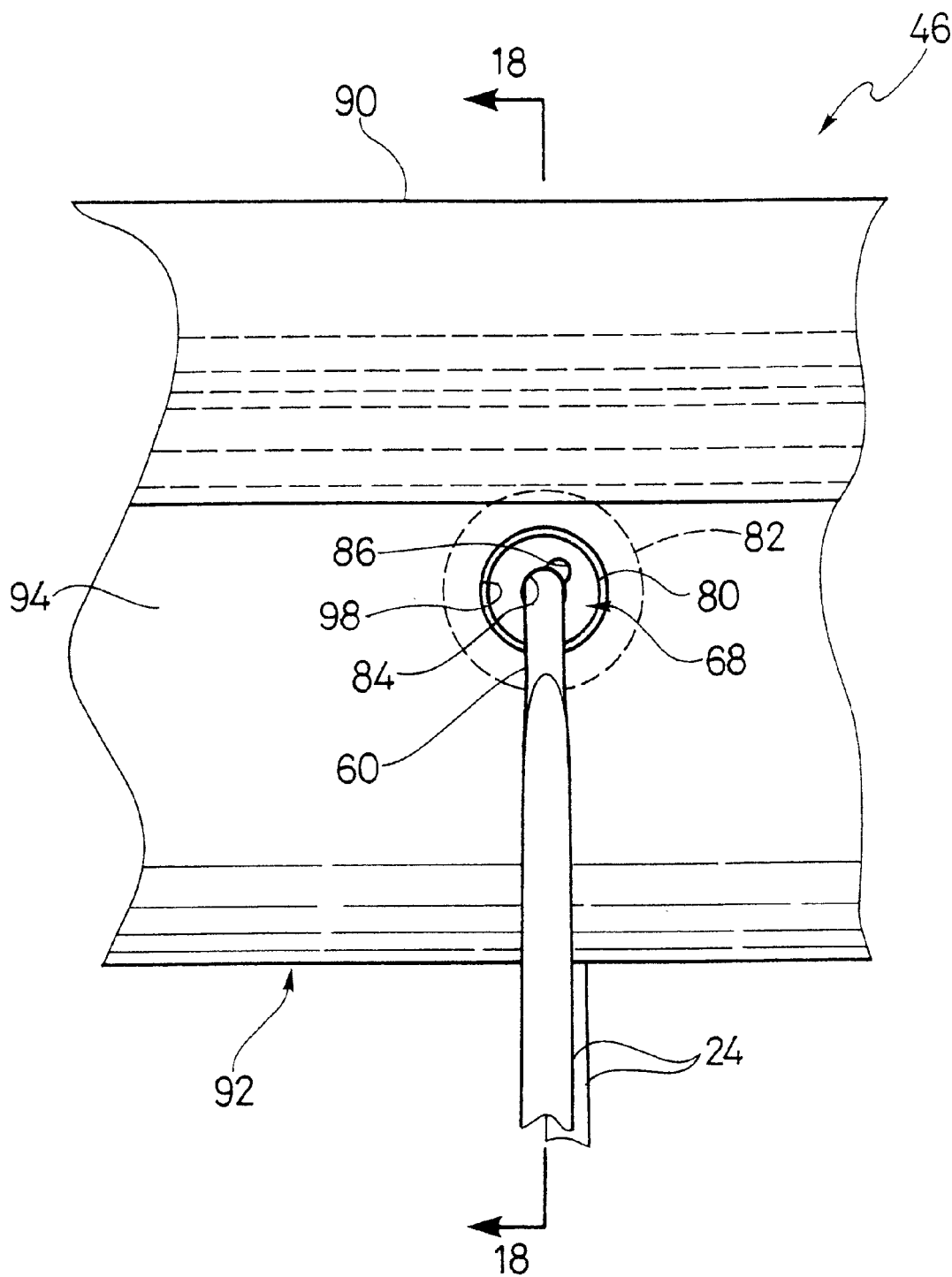
FIG. 17 is an enlarged partial side elevational view of a rim of the rear wheel illustrated in FIGS. 1 and 12 with a pair of spokes coupled thereto.
Figure 18:
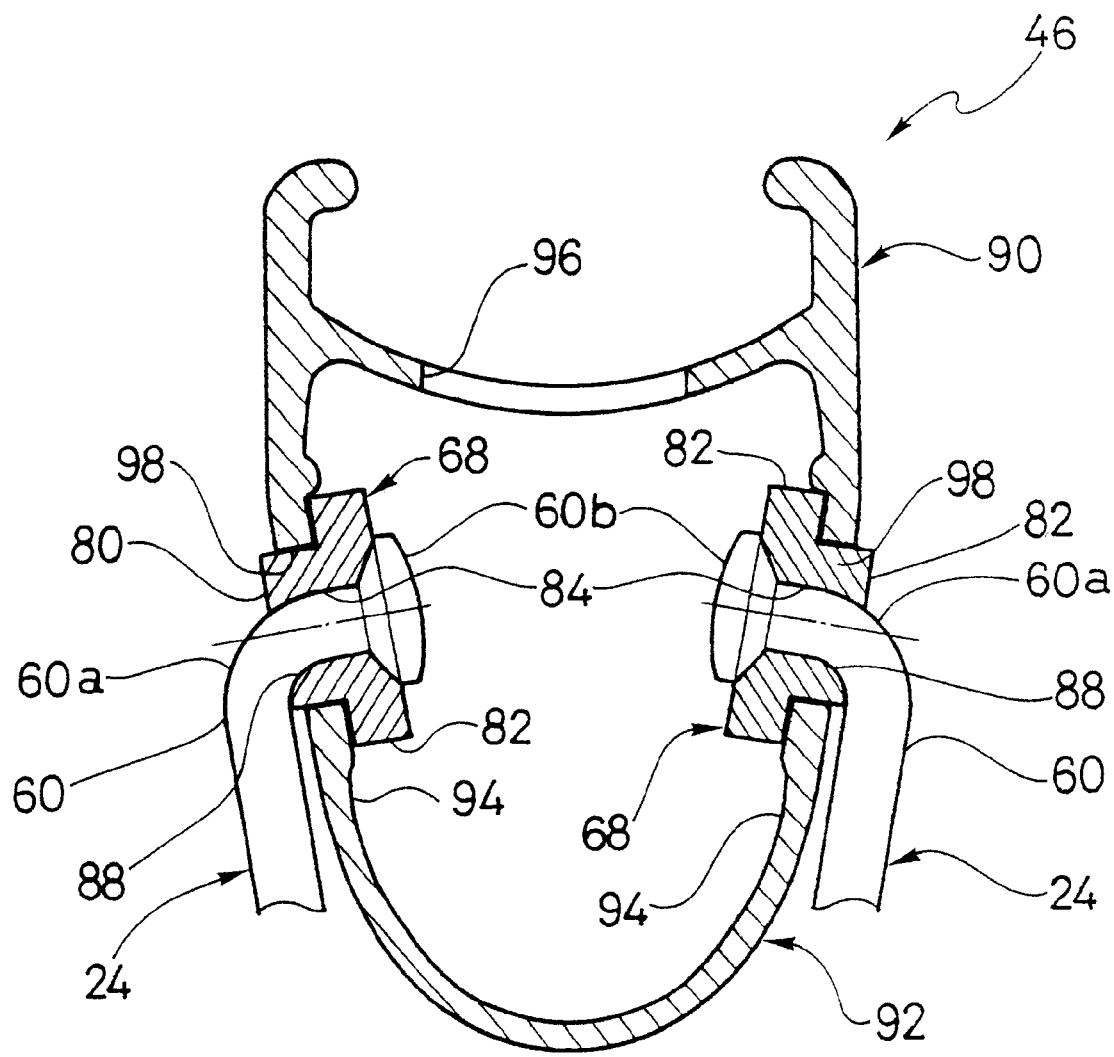
FIG. 18 is a partial, cross-sectional view of the portion of the rim illustrated in FIG. 17 as seen along section lines 18—18 of FIG. 17 with a pair of spokes shown in elevation.

Referring to FIGS. 17 and 18, rim 46 includes an outer annular portion 90 adapted to receive tire 28 and an annular spoke attachment portion 92. The rim 46 is a so-called deep rim in which the rim's radial height is greater than the rim's axial width. Rim 46 is designed to have a "clincher" type pneumatic tire 28 fastened thereto in a conventional manner. Of course, it will be apparent to those skilled in the art that the shape of rim 46 could be modified to accommodate different types of tires as needed and/or desired without departing from the scope of the present invention. For example, rim 46 could be modified to accommodate "tubular" or "sew-up" type tires which are adapted to be cemented to an outer surface of a rim. In such a rim, outer annular portion 90 is formed of a curved tubular member and a tire is cemented to the outer surface of the tubular member.

Rim 46 of rear wheel 16 is identical to rim 26 of front wheel 14 except that spoke openings 98 are circumferentially aligned on opposite side of rim 46, rather than circumferentially staggered as in rim 26. Therefore rim 46 will not be discussed or illustrated in detail herein. Specifically, spoke openings 98 formed in one opposing side section 94 of rim 46 are circumferentially aligned with spoke openings 98 formed in the opposite opposing side section 94. Such an arrangement is due to the arrangement of mounting portions 56a and 56b of rear hub 42.

Referring again to FIGS. 9, 10, 17 and 18, reinforcement members or washers 68 will now be discussed in more detail. Reinforcement members or washers 68 are designed to disperse the stresses applied to rims 26 and 46 by spokes 24. Reinforcement members or washers 68 are preferably disk shaped members with each reinforcement member or washer 68 having a first (smaller) circular stepped portion 80, a second (larger) circular stepped portion 82 and a centrally located spoke hole 84. Preferably, reinforcement members or washers 68 are constructed as one-piece, unitary members.

An example of one suitable material for reinforcement members or washers 68 is aluminum alloy. Of course, other materials can be used. It will be readily apparent to those skilled in the art from this disclosure that reinforcement members or washers 48 do not have to be stepped as illustrated.

The diameters or widths of stepped portions 80 and 82 should be as large as reasonably possible to disperse the stresses on rims 26 and 46 from spokes 24. In other words, it is better for the diameters or widths of stepped portions 80 and 82 to be as large as reasonably possible. First circular stepped portion 80 of each of the reinforcement members or washers 68 can be frictionally retained within one of the spoke openings 78 or 98 of rims 26 and 46, respectively. Since spokes 24 are placed under tension between hubs 22 or 42 and rims 26 or 46, spokes 24 apply an inward radial force at circumferentially spaced locations that correspond to spoke openings 78 and 98. Accordingly, the strength of rims 26 and 46 is increased without adding thickness.

Spoke holes 84 of reinforcement washers 68 are designed so that spokes 24 can freely pass therethrough. The center portions 62 of spokes 24 are elliptical in cross-section. Accordingly, spoke holes 84 have longitudinally extending slots 86 that increase the effective diameter or width of spoke holes 84 to allow the center portions 62 of spokes 24 to pass therethrough. A slanted cutout or notch 88 is formed on the axial face of first step portion 80. This notch 88 accommodates the bent section 40a of the outer end portion of spoke 24.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub for use with bicycle spoke nipples, said bicycle hub comprising:
   a hub axle having a center axis extending between a first end and a second end;
   a hub body having
      a tubular center portion defining an interior passageway with said hub axle being rotatably supported therein,
      a first mounting portion coupled to a first end of said center portion, said first mounting portion having a plurality of first spoke openings extending axially to a first free edge of said first mounting portion and a plurality of first protrusions fixedly coupled to said first mounting portion and extending radially inwardly from said first mounting portion adjacent said first spoke openings to maintain the spoke nipples in said first spoke openings, said first mounting portion being configured to mount a first set of radial spokes thereto, and
      a second mounting portion coupled to a second end of said center portion, said second mounting portion having a plurality of second spoke openings formed therein, said second mounting portion including a plurality of radially extending attachment projections having said second spoke openings formed therein, said second mounting portion being configured to mount a second set of tangential spokes thereto; and
   a freewheel portion coupled to said hub body adjacent said second mounting portion of said hub body.

2. The bicycle hub according to claim 1, wherein
   said first mounting portion is tubular and said first spoke openings are elongated slots extending axially from said first free edge.

3. The bicycle hub according to claim 2, wherein
   each of said first protrusions is formed of an internal flange extending radially toward said center axis.

4. The bicycle hub according to claim 3, wherein
   each of said first protrusions extends between a pair of adjacent said first spoke openings.

5. The bicycle hub according to claim 4, wherein
   said first protrusions extend radially inwardly from said first free edge.

6. The bicycle hub according to claim 1, wherein
   said first mounting portion is tubular and each of said first protrusions is formed of an internal flange extending toward said center axis.

7. The bicycle hub according to claim 1, wherein
   said first protrusions extend radially inwardly from said first free edge.

8. The bicycle hub according to claim 1, wherein
each of said first protrusions extends between a pair of adjacent said first spoke openings.

9. The bicycle hub according to claim 1, wherein
said hub body includes a sleeve coupled within said center portion and extending beyond said first free edge to form part of said hub body.

10. The bicycle hub according to claim 1, wherein
said second mounting portion is a tubular portion with a non-circular shape to form said plurality of attachment projections.

11. A bicycle component assembly comprising:
a hub axle having a center axis extending between a first end and a second end;
a hub body having
a tubular center portion defining an interior passageway with said hub axle being rotatably supported therein,
a first mounting portion coupled to a first end of said center portion, said first mounting portion having a plurality of first spoke openings extending axially to a first free edge of said mounting portion and a plurality of first protrusions fixedly coupled to said first mounting portion and extending radially inwardly from said first mounting portion adjacent said first spoke openings to maintain the spoke nipples in said first spoke openings, and
a second mounting portion coupled to a second end of said center portion, said second mounting portion having a plurality of second spoke openings formed therein, said second mounting portion including a plurality of radially extending attachment projections having said second spoke openings formed therein;
a plurality of elongated outwardly extending spokes coupled to said hub body with each of said spokes having an inner end portion and an outer end portion, said inner end portions being received in said first and second spoke openings, said spokes received in said first spoke openings extending radially and said spokes received in said second spoke openings extending tangentially; and
a freewheel portion coupled to said hub body adjacent said second mounting portion of said hub body.

12. The bicycle component assembly according to claim 11, wherein
said inner end portions of said spokes have spoke nipples threaded coupled thereto.

13. The bicycle component assembly according to claim 11, further comprising
an annular rim coupled to said outer ends of said spokes, said annular rim being adapted to receive a tire.

14. A bicycle hub for use with bicycle spoke nipples, said bicycle hub comprising:
a hub axle having a center axis extending between a first end and a second end; and
a hub body having
a tubular center portion defining an interior passageway with said hub axle being rotatably supported therein,
a first mounting portion coupled to a first end of said center portion, said first mounting portion having a plurality of first spoke openings extending axially to a first free edge of said mounting portion and a plurality of first protrusions fixedly coupled to said first mounting portion and extending radially inwardly from said first mounting portion adjacent said first spoke openings to maintain the spoke nipples in said first spoke openings, and
a second mounting portion coupled to a second end of said center portion, said second mounting portion having a plurality of second spoke openings formed therein, said second mounting portion being a non-circular shaped tubular member forming a plurality of radially extending attachment projections having said second spoke openings formed therein.

15. The bicycle hub according to claim 14, wherein
said first mounting portion is tubular and said first spoke openings are elongated slots extending axially from said first free edge.

16. The bicycle hub according to claim 14, wherein
said first mounting portion is tubular and each of said first protrusions is formed of an internal flange extending toward said center axis.

17. The bicycle hub according to claim 14, wherein
each of said first protrusions extends between a pair of adjacent said first spoke openings.

18. The bicycle hub according to claim 14, wherein
said first protrusions extend radially inwardly from said first free edge.

19. A bicycle component assembly comprising:
a hub axle having a center axis extending between a first end and a second end;
a hub body having
a tubular center portion defining an interior passageway with said hub axle being rotatably supported therein,
a first mounting portion coupled to a first end of said center portion, said first mounting portion having a plurality of first spoke openings extending axially to a first free edge of said mounting portion and a plurality of first protrusions fixedly coupled to said first mounting portion and extending radially inwardly from said first mounting portion adjacent said first spoke openings to maintain the spoke nipples in said first spoke openings, and
a second mounting portion coupled to a second end of said center portion, said second mounting portion having a plurality of second spoke openings formed therein, said second mounting portion being a non-circular shaped tubular member forming a plurality of radially extending attachment projections having said second spoke openings formed therein; and
a plurality of elongated outwardly extending spokes coupled to said hub body with each of said spokes having an inner end portion and an outer end portion, said inner end portions being received in said first and second spoke openings.

20. The bicycle component assembly according to claim 19, wherein
said inner end portions of said spokes have spoke nipples threaded coupled thereto.

21. The bicycle component assembly according to claim 19, further comprising
an annular rim coupled to said outer ends of said spokes, said annular rim being adapted to receive a tire.

* * * * *